(12) United States Patent
Zaleski, Jr. et al.

(10) Patent No.: US 10,107,504 B2
(45) Date of Patent: Oct. 23, 2018

(54) BAKING OVEN HAVING HIGH EMISSIVITY COATING

(71) Applicant: Reading Bakery Systems, Inc., Robesonia, PA (US)

(72) Inventors: Joseph S. Zaleski, Jr., Mohrsville, PA (US); Paul Mitchell, Pitman, PA (US); Greg Hill, Wernersville, PA (US); David Horning, Lebanon, PA (US)

(73) Assignee: Reading Bakery Systems, Inc., Robesonia, PA (US)

( * ) Notice: Subject to any disclaimer, the term of this patent is extended or adjusted under 35 U.S.C. 154(b) by 139 days.

(21) Appl. No.: 15/171,599

(22) Filed: Jun. 2, 2016

(65) Prior Publication Data

US 2017/0350602 A1    Dec. 7, 2017

(51) Int. Cl.
*F24C 3/00* (2006.01)
*F24C 15/00* (2006.01)
*F24C 15/16* (2006.01)

(52) U.S. Cl.
CPC ............ *F24C 15/005* (2013.01); *F24C 15/16* (2013.01)

(58) Field of Classification Search
CPC .................................................... F24C 15/005
USPC ......................................................... 126/19 R
See application file for complete search history.

(56) References Cited

U.S. PATENT DOCUMENTS

| | | | |
|---|---|---|---|
| 6,041,769 A * | 3/2000 | Llodra, Jr. .......... | A47J 37/0759 126/197 |
| 8,840,942 B2 | 9/2014 | Olver et al. | |
| 2010/0006559 A1 * | 1/2010 | Distaso .................. | F24C 7/065 219/408 |

* cited by examiner

*Primary Examiner* — Avinash Savani
(74) *Attorney, Agent, or Firm* — Panitch Schwarze Belisario & Nadel LLP

(57) ABSTRACT

An oven for baking a food product includes a housing having a ceiling, a floor, first and second opposing side walls, at least one internal heating zone defined by the ceiling, the floor and the first and second opposing side walls, and at least one heating source for providing heat to the at least one internal heating zone. The ceiling is formed of carbon steel. At least a surface of the ceiling facing the at least one internal heating zone is formed as a high emissivity chemical conversion coating.

20 Claims, 3 Drawing Sheets

BAKING OVEN HAVING HIGH EMISSIVITY COATING

BACKGROUND OF THE INVENTION

The present invention is generally directed to a baking oven including at least one internal surface which is provided with a high emissivity surface treatment or surface coating.

There are numerous known types of ovens for cooking, and in particular baking, food products. These different types of baking ovens are generally suited for different end users or applications, including, but not limited to, ovens for personal use, ovens for commercial use in restaurants, and ovens for commercial food production. Ovens for commercial food production include direct fired tunnel ovens, steel band ovens, steel plate ovens, direct fired tray ovens, indirect fired tunnel ovens, and the like. One particular type of known oven, which is particularly applicable to the present invention, is a direct gas flame (DGF) oven.

One of the primary objectives in the field of baking ovens is to ensure that there is an even application of heat to the food products being baked therein, thereby ensuring uniformly baked food products. Different mechanisms have been utilized to satisfy this objective. For example, some known baking ovens utilize controllers to continuously monitor and adjust the temperature in the oven. Others utilize specific materials to form the walls of the oven. For example, Reading Bakery Systems, Inc., the assignee of the present application, manufactures and utilizes a DGF oven including a brick ceiling. The brick ceiling exhibits high heat storage as well as superior radiant heat application to the food product which passes beneath the ceiling. However, one drawback of this known oven is that the bricks may fail after a certain duration of use by cracking and flaking which, in turn, may result in the brick ceiling material being deposited onto the passing food product.

Thus, it would be desirable to provide a cost-efficient and durable baking oven which provides even radiant heat distribution throughout the internal cooking chamber of the oven to consistently produce evenly cooked food products, and which avoids the possibility of contamination of the food products baked therein.

BRIEF SUMMARY OF THE INVENTION

In one embodiment, the present invention is directed to an oven for making a food product. The oven includes a housing having a ceiling, a floor, first and second opposing side walls, at least one internal heating zone defined by the ceiling, the floor and the first and second opposing side walls, and at least one heating source for providing heat to the at least one internal heating zone. The ceiling is formed of carbon steel. A surface of the ceiling facing the internal heating zone is formed as a high emissivity chemical conversion coating.

BRIEF DESCRIPTION OF THE SEVERAL VIEWS OF THE DRAWINGS

The following detailed description of preferred embodiments of the invention will be better understood when read in conjunction with the appended drawings. It should be understood, however, that the disclosure is not limited to the precise arrangements and instrumentalities shown. In the drawings.

DETAILED DESCRIPTION OF THE INVENTION

Figure 1:
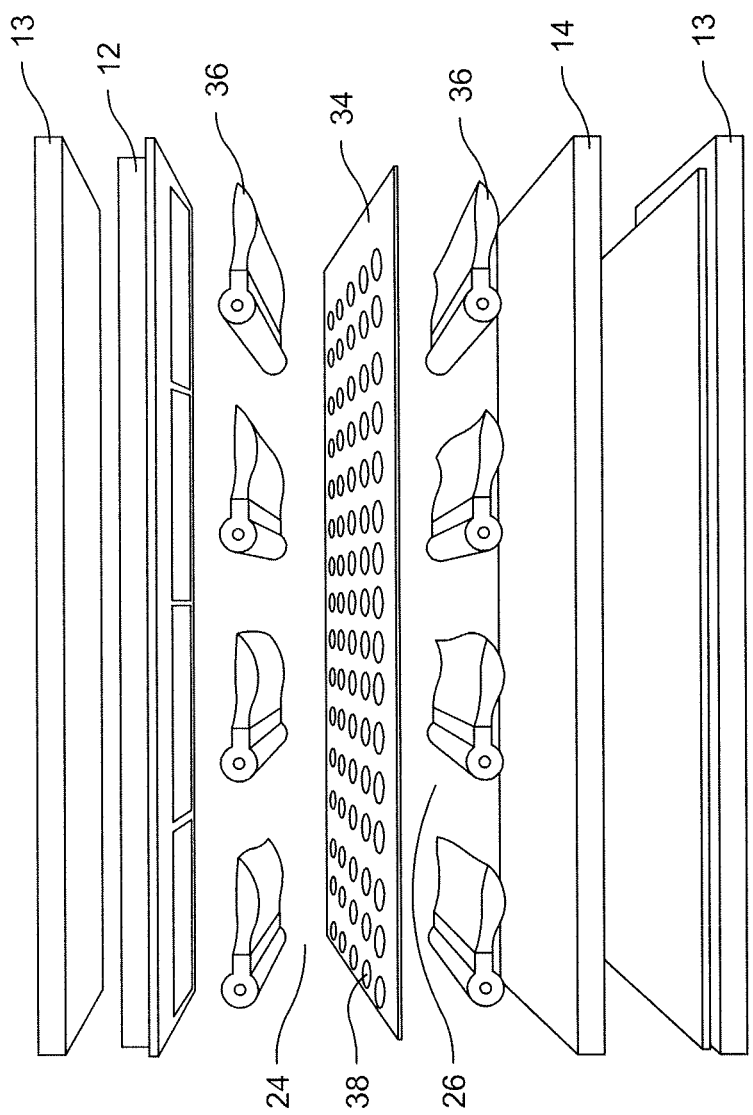
FIG. 1 is an exploded, partial side cross-sectional view of an oven, according to an embodiment of the invention.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the food product, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
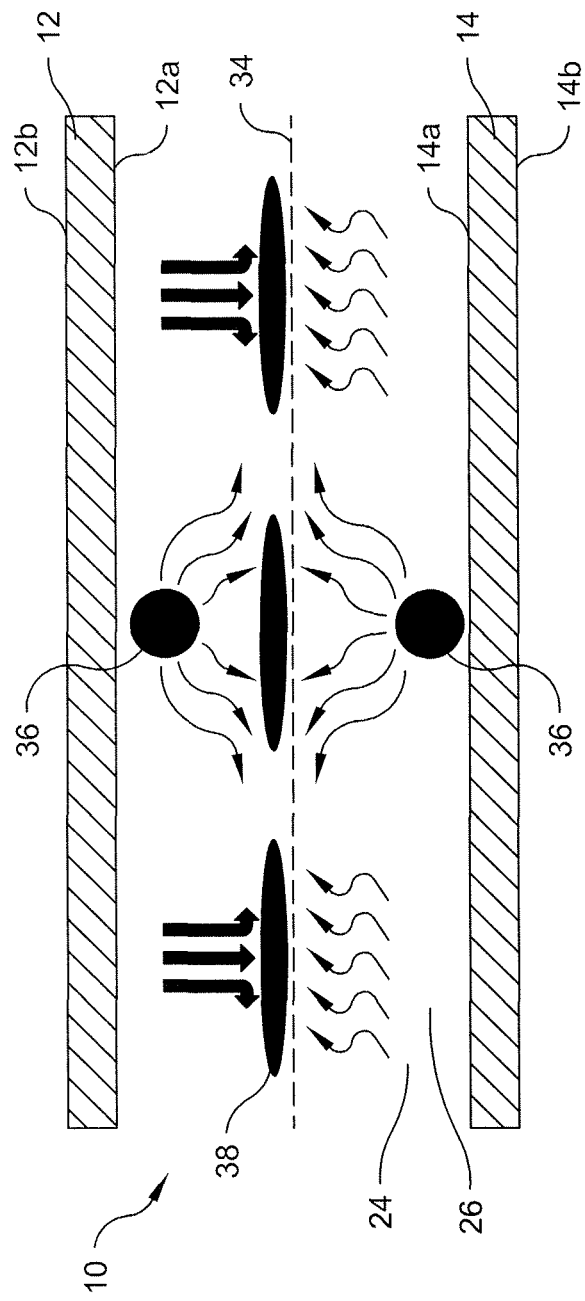
FIG. 2 is a schematic partial side cross-sectional view of an oven, according to an embodiment of the invention.

Referring to the drawings in detail, wherein like numerals indicate like elements throughout, there is shown in FIGS. 1-2, an oven, generally designated 10, in accordance with the present invention. The oven 10 comprises a housing 13 having a first open end and an opposing second open end, to the left and right sides of the oven shown in FIGS. 1 and 2. The housing 13 includes a ceiling 12, a floor 14 opposite to the ceiling 12, and first and second opposing side walls, not shown but located to the front and rear of the plane of FIGS. 1 and 2, all of which extend between the first and second opposing open ends of the oven 10. The ceiling 12 has an internal surface 12a and an external surface 12b. The floor 14 has an internal surface 14a and an external surface 14b. Each of the side walls has an internal surface and an external surface. The oven 10 further includes an internal cooking or baking chamber 24 defined by the ceiling 12, floor 14 and side walls of the oven 10, and more particularly by the internal surfaces 12a, 14a, of these structures.

The ceiling 12 of the oven 10 is preferably made of a metal material. More preferably, the floor 14, the first side wall and/or the second side wall is/are also made of a metal material. The metal material may be a material selected from the group consisting of carbon steel, aluminized steel and stainless steel. In a preferred embodiment, the ceiling 12 is made of carbon steel. In one embodiment, the floor 14, the first side wall and/or the second side wall is/are also made of carbon steel. In another embodiment, the floor 14, the first side wall and/or the second side wall is/are made of aluminized steel to inhibit oxidation.

In one embodiment, a marinite board, preferably a 1" marinite C board, backs the carbon steel ceiling 12 as an insulator. The marinite has the heat storage capability to maintain a high temperature. Such an arrangement simulates a 2" brick ceiling to hold and re-radiate heat.

In the embodiment shown in FIGS. 1-2, the oven 10 is a DGF tunnel oven. The internal cooking chamber 24 includes at least one internal heating zone 26, and more preferably a plurality of internal heating zones 26. Each heating zone 26 may have a different temperature. The DGF oven 10 further includes a conveyor system having a first roller (not shown) positioned proximate the first open end, a second roller (not shown) positioned proximate the second open end, and a conveyor belt 34 which rotates about the first and second rollers and travels essentially horizontally through the oven, for example from left to right in FIGS. 1 and 2. The conveyor belt 34 is configured to carry at least one food product 38 thereon, and more particularly a plurality of food products 38 thereon, as it travels through the internal cooking chamber 24 and multiple heating zones 26 of the oven 10.

The oven 10 includes at least one heating source 36 configured to provide heat to the internal heating zone(s) 26. Preferably, the oven 10 includes at least one heating source 36 positioned above the conveyor belt 34 (i.e., proximate the ceiling 12) and at least one heating source 36 positioned below the conveyor belt 34 (i.e., proximate the floor 14). More preferably, the oven 10 includes a plurality of heating sources 36 positioned above the conveyor belt 34 and a plurality of heating sources 36 positioned below the conveyor belt 34. Preferably, each heating source 36 is in the form of a burner. The temperature within the internal cooking chamber 24 and each of the heating zones 26 is controlled by increasing and decreasing the firing rate of one or more of the burners 36.

In one embodiment, the oven 10 has a width of approximately 48 to 60 inches and a length of approximately 100 to 300 feet. In one embodiment, the burners 36 are spaced every 24 to 30 inches along the length of the oven 10.

In the DGF oven 10, heat is transferred to the food products 38 via various heat transfer processes. Specifically, heat is transferred to the food products 38 from the heated conveyor belt 34 by conduction, from all internal surfaces of the oven 10 which are at a higher temperature than the food products 38 by radiation, and from the surrounding air currents by convection. For the convection heat transfer, as the air hits the food products 38 at a higher rate, the convective heat transfer rate increases. The sum of the conductive, radiant and convective heat is the total amount of heat absorbed by the food products 38 during baking.

In one embodiment, the internal surface 12*a*, 14*a* of at least one of the ceiling 12, the floor 14 and the side walls is provided with a surface treatment or surface coating. As used herein, "internal surface" refers to a surface of the ceiling, floor or side walls facing the internal heating zone (s). Preferably, at least a portion of at least the internal surface 12*a* of the ceiling 12 is provided with the surface treatment or surface coating. More preferably, the entire internal surface 12*a* of the ceiling 12 is provided with the surface treatment or surface coating. In another embodiment, at least a portion or the entirety of the internal surface 14*a* of the floor 14, first side wall and/or second side wall is also provided with the surface treatment or surface coating. In another embodiment, the burners 36, and more particularly emitter plates of the burners 36, may be provided with the surface treatment or surface coating. It will be understood that the present invention extends to any surface of the oven 10 being provided with the surface treatment or surface coating.

In one embodiment, the surface treatment or surface coating is a chemical surface treatment, and more particularly a chemical conversion coating. More preferably, the surface treatment alters the properties of the treated surface to form a surface which has a high emissivity value. The emissivity ($\varepsilon$) of a material is the relative ability of the material to emit energy by radiation (i.e., radiant heat distribution). The emissivity values for all materials fall within the range of 0 for reflective materials) to 1 (i.e., for black bodies).

In one embodiment, the chemical conversion coating is black oxide which has a relatively high emissivity. That is, in a preferred embodiment of the oven 10 of the present invention, an internal carbon steel surface of the oven 10 is treated with black oxide. Black oxide is a chemical surface treatment which alters the properties of the steel to provide the treated surface with a high emissivity value and thus allows for improved radiant heat transfer by the treated surface. More particularly, the surface treatment is a process of forming a black iron oxide on an internal surface of the carbon steel structure (i.e., the ceiling 12, the floor 14, the first side wall, the second side wall, and the like). Preferably, at least the internal surface 12*a* of the ceiling 12 is formed as the chemical conversion coating, preferably black oxide.

The black oxide process produces a chemical conversion coating which results when a ferrous metal is brought into contact with a black oxide solution. This may be carried out in a number of different ways, such as by dipping the ferrous metal structure into the black oxide solution, applying the black oxide solution to a stationary ferrous metal structure, such as spraying, brushing, or the like. In one embodiment, the surface to be coated is cleaned with a chemical solution prior to being brought into contact with the black oxide solution.

The black oxide coating is produced on the surface of the carbon steel structure (e.g., the internal surface 12*a* of the ceiling 12) by a chemical reaction between the iron on the surface of the carbon steel metal and the oxidizing salts present in the black oxide solution. The oxidizing salts include penetrants, catalysts, activators and additives which all take part in the chemical reaction. The result of this chemical reaction is the formation of black iron oxide, also known as magnetite ($Fe_3O_4$), on the surface of the metal surface being coated. The black oxide is thus not a self-sustaining film or layer. Instead, the internal surface 12*a* of the ceiling 12, for example, is converted to a black oxide coating by a chemical process. As such, the internal surface 12*a* of the ceiling 12 is preferably formed as black oxide finish.

In one embodiment, a treatment oil may be applied to the black oxide finish (e.g., in order to increase the corrosion protection properties of the black oxide coating/finish). The oil may be either water-soluble or water displacing. A clear wax or acrylic may be used as an alternative to the oil.

Figure 3:
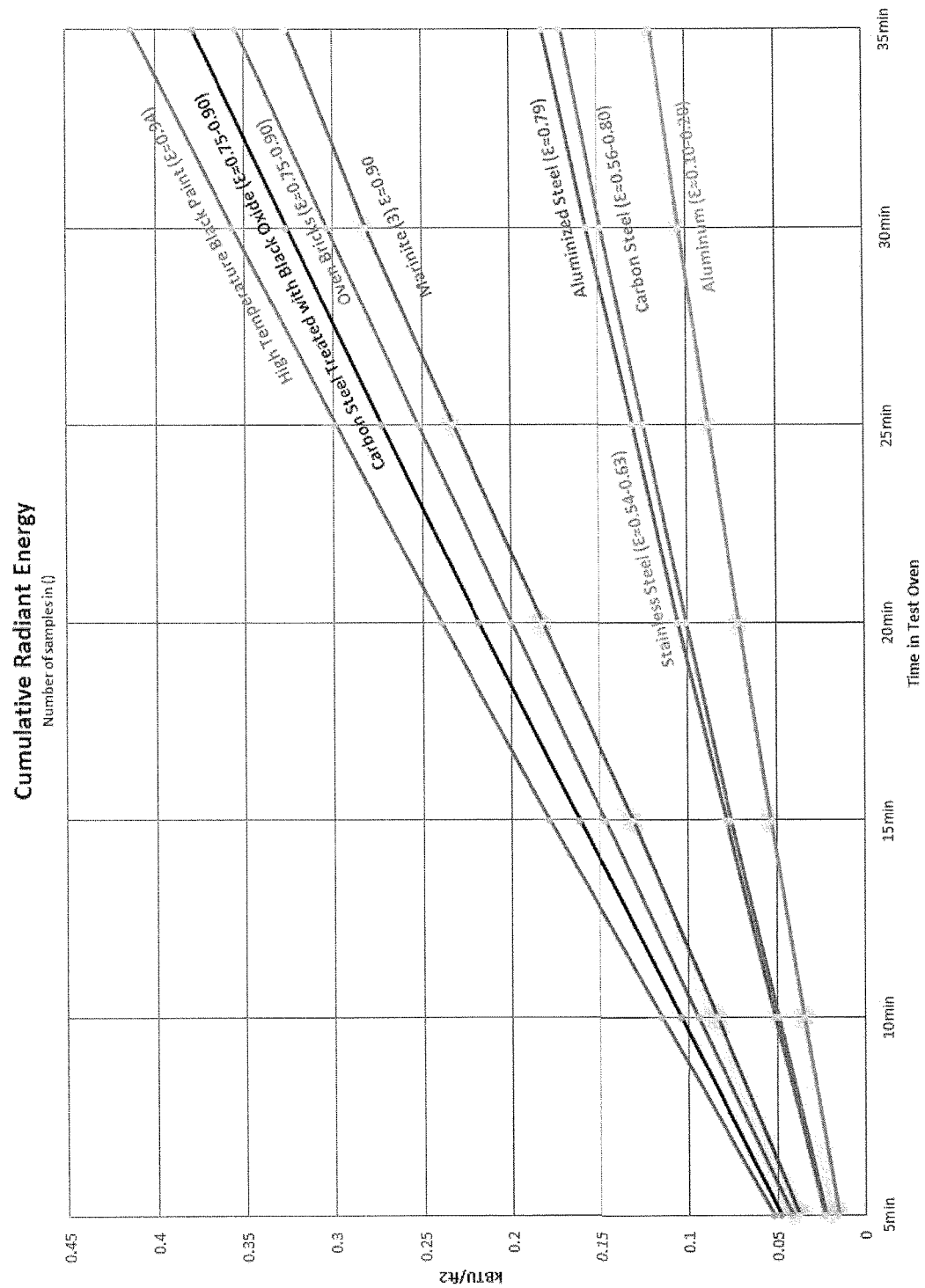
FIG. 3 is a graphical summary of the emissivity values of various materials.

The oven 10 having the ceiling 12 with the black oxide treated internal surface 12*a* increases radiant heat transfer to the food products 38 passing through the oven 10 by approximately 50%. More particularly, as shown in FIG. 3, the black oxide treated internal surface 12*a* of the carbon steel ceiling 12 has an emissivity value in the range of 0.75 to 0.90.

While the structure described above and shown in the accompanying figures is that of a DGF tunnel oven, it will be understood by those skilled in the art that the present invention, and more particularly, the inclusion of a black oxide conversion coating, is applicable to virtually any oven or other appliance or cooking accessory used for cooking food products.

Food products made in the oven of the present invention and by the process of the present invention are uniformly cooked to the superior radiant heat distribution provided for by the treated internal surface, and more particularly by the black oxide treated ceiling of the oven.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An oven for baking a food product, the oven being a direct gas fired oven, the oven comprising:
   a housing including a ceiling, a floor, first and second opposing side walls, and at least one internal heating zone defined by the ceiling, the floor and the first and second side walls, the ceiling being formed of carbon steel;
   at least one heating source for providing heat to the at least one internal heating zone; and
   a conveyor belt configured to carry at least one food product through the oven,
      wherein at least a surface of the ceiling facing the at least one internal heating zone is formed as a high emissivity chemical conversion coating.

2. The oven according to claim 1, wherein the oven comprises a plurality of internal heating zones.

3. The oven according to claim 1, wherein the at least one heating source is a burner.

4. The oven according to claim 1, wherein the oven comprises a plurality of heating sources.

5. The oven according to claim 1, wherein the high emissivity chemical conversion coating is black oxide.

6. The oven according to claim 1, further comprising a treatment layer applied over the high emissivity chemical conversion coating, the treatment layer being formed of a material selected from an oil, a clear wax and an acrylic.

7. The oven according to claim 1, wherein at least one additional surface facing the at least one internal heating zone is formed as a high emissivity chemical conversion coating.

8. An oven for baking a food product, comprising:
   a housing including a ceiling, a floor, first and second opposing side walls, and at least one internal heating zone defined by the ceiling, the floor and the first and second side walls, the ceiling being formed of carbon steel; and
   at least one heating source for providing heat to the at least one internal heating zone,
      wherein at least a surface of the ceiling facing the at least one internal heating zone is formed as a high emissivity chemical conversion coating, and
      wherein the high emissivity chemical conversion coating is black oxide.

9. The oven according to claim 8, wherein the oven is a direct gas fired oven.

10. The oven according to claim 9, wherein the oven comprises a plurality of internal heating zones.

11. The oven according to claim 9, further comprising a conveyor belt configured to carry at least one food product through the oven.

12. The oven according to claim 8, wherein the at least one heating source is a burner.

13. The oven according to claim 8, wherein the oven comprises a plurality of heating sources.

14. The oven according to claim 8, further comprising a treatment layer applied over the high emissivity chemical conversion coating, the treatment layer being formed of a material selected from an oil, a clear wax and an acrylic.

15. The oven according to claim 8, wherein at least one additional surface facing the at least one internal heating zone is formed as a high emissivity chemical conversion coating.

16. An oven for baking a food product, comprising:
   a housing including a ceiling, a floor, first and second opposing side walls, and at least one internal heating zone defined by the ceiling, the floor and the first and second side walls, the ceiling being formed of carbon steel; and
   at least one heating source for providing heat to the at least one internal heating zone,
      wherein at least a surface of the ceiling facing the at least one internal heating zone is formed as a high emissivity chemical conversion coating, and
      wherein a treatment layer is applied over the high emissivity chemical conversion coating, the treatment layer being formed of a material selected from an oil, a clear wax and an acrylic.

17. The oven according to claim 16, wherein the oven is a direct gas fired oven.

18. The oven according to claim 17, wherein the oven comprises a plurality of internal heating zones.

19. The oven according to claim 17, further comprising a conveyor belt configured to carry at least one food product through the oven.

20. The oven according to claim 16, wherein the high emissivity chemical conversion coating is black oxide.

* * * * *